United States Patent [19]

Kokko et al.

[11] Patent Number: 6,005,852
[45] Date of Patent: Dec. 21, 1999

[54] LOAD CONTROL METHOD AND APPARATUS FOR CDMA CELLULAR SYSTEM HAVING CIRCUIT AND PACKET SWITCHED TERMINALS

[75] Inventors: Ismo Kokko; Kari Rikkinen, both of Oulu, Finland

[73] Assignee: Nokia Mobile Phones Limited, Salo, Finland

[21] Appl. No.: 09/064,247

[22] Filed: Apr. 22, 1998

Related U.S. Application Data

[63] Continuation of application No. 08/716,997, Sep. 20, 1996, Pat. No. 5,790,534.

[51] Int. Cl.$^6$ .................................................. H04J 13/04
[52] U.S. Cl. ........................................ 370/329; 455/509
[58] Field of Search ................................. 370/319, 330, 370/280, 281, 329, 335, 342, 431, 437, 441, 465, 468, 522; 455/517, 509, 450, 452

[56] References Cited

U.S. PATENT DOCUMENTS

| | | | |
|---|---|---|---|
| 3,548,108 | 12/1970 | Yamato et al. | 370/319 |
| 4,761,781 | 8/1988 | Calvignac et al. | 370/352 |
| 4,887,265 | 12/1989 | Felix | 370/94.1 |
| 4,980,886 | 12/1990 | Bernstein | 370/433 |
| 5,008,883 | 4/1991 | Eizenhofer et al. | 370/95.1 |
| 5,103,445 | 4/1992 | Ostlund | 370/79 |
| 5,142,533 | 8/1992 | Crisler et al. | 370/95.1 |
| 5,166,929 | 11/1992 | Lo | 370/85.3 |
| 5,257,257 | 10/1993 | Chen et al. | 370/18 |
| 5,276,680 | 1/1994 | Messenger | 370/85.1 |
| 5,392,280 | 2/1995 | Zheng | 370/433 |
| 5,396,653 | 3/1995 | Kivari et al. | 455/88 |
| 5,420,864 | 5/1995 | Dahlin et al. | 370/95.3 |
| 5,430,740 | 7/1995 | Kivari et al. | 371/37.1 |
| 5,432,790 | 7/1995 | Hluchyj et al. | 370/468 |
| 5,434,847 | 7/1995 | Kou | 370/17 |
| 5,577,024 | 11/1996 | Malkamaki et al. | 370/18 |
| 5,598,412 | 1/1997 | Griffith et al. | 370/352 |
| 5,633,873 | 5/1997 | Kay et al. | 370/336 |
| 5,640,395 | 6/1997 | Hamalainen et al. | 370/322 |
| 5,644,576 | 7/1997 | Bauchot et al. | 370/337 |
| 5,729,541 | 3/1998 | Hamalainen et al. | 370/337 |

FOREIGN PATENT DOCUMENTS

| | | |
|---|---|---|
| 0399612 A2 | 11/1990 | European Pat. Off. . |
| 0587980 A2 | 3/1994 | European Pat. Off. . |
| 2 270 815 | 3/1994 | United Kingdom . |

OTHER PUBLICATIONS

IEEE Transactions On Vehicular Technology, "Voice And Data Integration in the Air–Interface of a Microcellular Mobile Communication System", vol. 42, No. 1, Feb. 1993.

Electronics & Communication Journal, "A reservation based access mechanism for 3rd generation cellular systems", Jun., 1993, No. 3.

IEEE Transactions On Vehicular Technology, "A Reservation Multiple Access Protocol for Microcellular Mobile–Communication Systems", vol. 39, No. 4, Nov. 1990.

*Primary Examiner*—Huy D. Vu
*Attorney, Agent, or Firm*—Ohlandt, Greeley Ruggiero & Perle, L.L.P.

[57] ABSTRACT

A method for operating a cellular communications system of a type that includes a first type of terminal having real-time transmission needs and a second type of terminal having nonreal-time transmission needs. The method includes the steps of (a) determining at periodic intervals a total amount of capacity required to service the first type of terminals; (b) subtracting the determined amount from a current maximum capacity; and (c) allocating all or some of the remaining capacity, if any, to one or more of the second type of terminals.

23 Claims, 7 Drawing Sheets

# LOAD CONTROL METHOD AND APPARATUS FOR CDMA CELLULAR SYSTEM HAVING CIRCUIT AND PACKET SWITCHED TERMINALS

This application is a continuation application of U.S. patent application Ser. No. 08/716,997, filed on Sep. 20, 1996, now U.S. Pat. No. 5,790,534.

FIELD OF THE INVENTION

This invention relates generally to cellular communications systems and, in a preferred embodiment, to Direct Sequence, Code Division Multiple Access (DS-CDMA) cellular communications systems.

BACKGROUND OF THE INVENTION

Modern cellular communications systems are required to handle both circuit switched (e.g., telephone voice calls) and packet switched (e.g., packetized data) transmissions between user terminals and base stations. However, the requirements of these two types of transmissions are different in many respects. For example, circuit switched transmissions must be handled in real-time or approximately real-time, while packet switched transmissions can (usually) tolerate some degree of delayed operation (substantially nonreal-time). Further by example, an optimum transmission rate for packetized data may be an order of magnitude greater than a maximum transmission rate for vocoded (digitized) voice.

In that the communication channel or channels of the cellular system have some finite information carrying capacity, it can be realized that it is important in the design and implementation of a cellular communications system to adequately consider the foregoing and other differences between the requirements of circuit switched and packet switched traffic so as to properly allocate the information carrying capacity of the channel or channels. In particular, it is important to control the communications traffic loading of the channel or channels in accordance with the dynamically varying requirements of circuit switched and packet switched traffic originating from various terminals.

Reference can be had to, by example, commonly assigned U.S. Pat. No. 5,257,257, issued Oct. 26, 1993, entitled "Method of Controlling the Operation of a Packet Switched CDMA Communications Network for Controlling the Operation of Transmitters and Receivers", by X. H. Chen and J. Oksman, for teaching one prior art CDMA system having packet switched capability.

OBJECTS OF THE INVENTION

It is thus a first object of this invention to provide a method and system for controlling the communications load in a communications system having terminals capable of originating circuit switched and packet switched traffic.

It is a further object of this invention to provide a method and system for controlling the communications load in a DS-CDMA cellular communications system having terminals capable of originating circuit switched and packet switched traffic.

SUMMARY OF THE INVENTION

The foregoing and other problems are overcome and the objects of the invention are realized by methods and apparatus in accordance with embodiments of this invention. A method of this invention is disclosed for operating a wireless mobile or user station to provide a reverse link load control function in a CDMA communications system.

A method for controlling the load of the packet mode connections in a cellular network, such as a CDMA network, includes the following steps. (A) Data terminals requiring new resources send a request to a base station using a reverse control channel assigned to each terminal. (B) The base station calculates the necessary resource requirements based on the received requests. (C) The base station determines the available cell resources for packet switched transmissions based on the total allowed load and on the load of the circuit switched connections. (D) The base station allocates any available resources to the requesting packet switched terminals. (E) If the resource needs do not exceed the available resources, the base station sends a permission to transmit to all requesting packet switched terminals. (F) If the resource needs exceed the available resources, the base station instead sends the permission to transmit according to a predefined algorithm or rule base, such as 'first in, first served' or 'equal service for all'.

This invention thus teaches a method for operating a cellular communications system of a type that includes a first type of terminal having real-time transmission needs and a second type of terminal having nonreal-time transmission needs. The method includes the steps of (a) determining at periodic intervals a total amount of capacity required to service the first type of terminals; (b) subtracting the determined amount from a current maximum capacity; and (c) allocating all or some of the remaining capacity, if any, to one or more of the second type of terminals. This invention also pertains to a cellular communications system that operates in accordance with the method.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

This invention teaches a method wherein a base station (BS) in a CDMA radio system controls the data transmission from packet terminals to BS so that the radio resources allocated for the system are utilized optimally.

Figure 1:
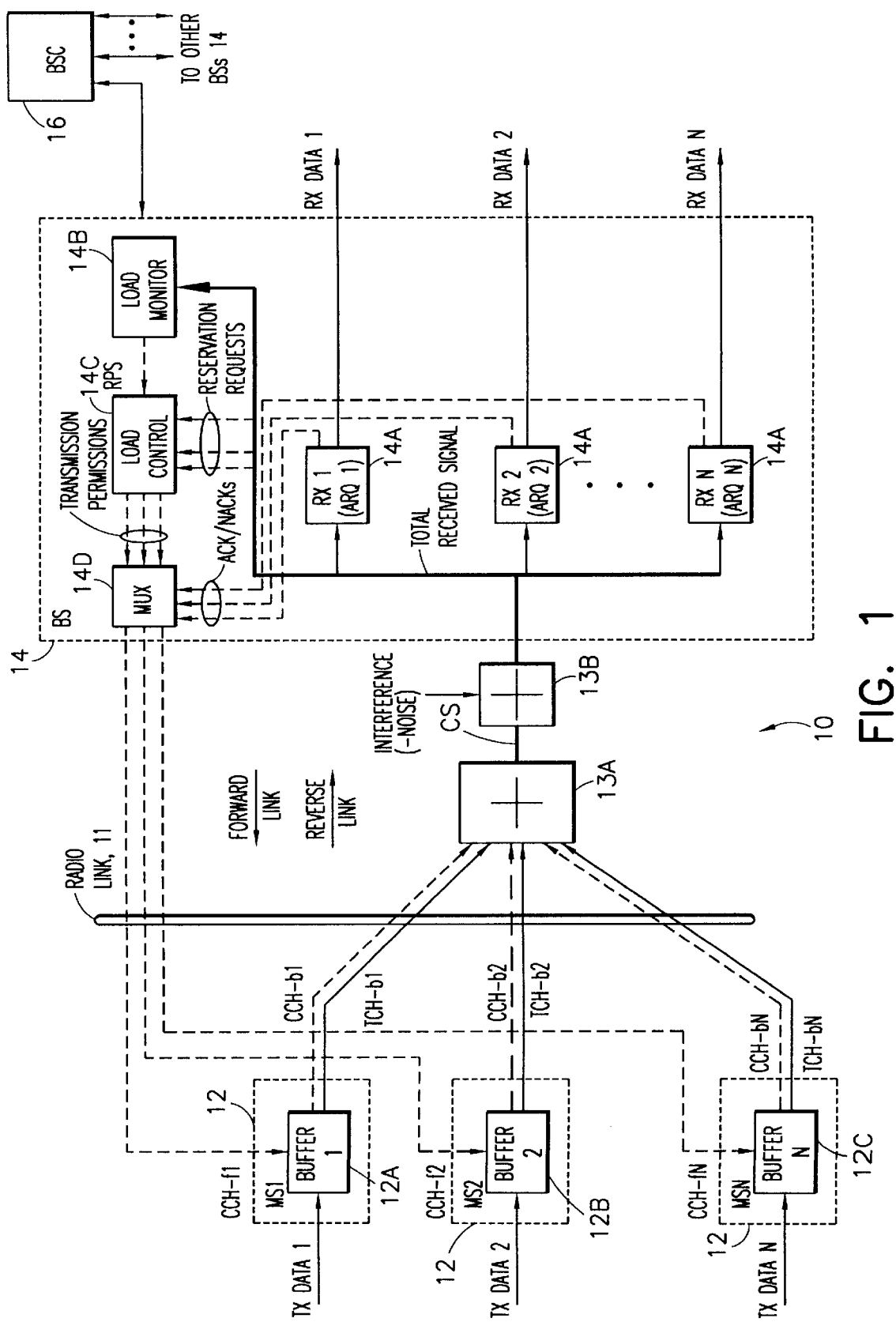
FIG. 1 is a block diagram of a cellular communication system that is constructed and operated in accordance with this invention.

Referring to FIG. 1, there is illustrated a cellular CDMA communications system 10 that is constructed and operated in accordance with this invention. A number of packet terminals or mobile stations (MSs) 12 are bidirectionally connected to a base station (BS) 14 through a radio link 11.

The BS 14 is assumed to serve a cell, either a microcell or a macrocell. A plurality of similar base stations can be provided, each serving adjacent or non-adjacent cells to the cell served by the BS 14. Each terminal 12 includes a buffer 12A for storing incoming data packets (TX DATA) that are to be transmitted. The terminals 12 have a virtual connection to BS 14 that is implemented using forward (BS to MS) and reverse or backward control channels (MS-BS) CCH-f and CCH-b, respectively. By example, if there are N packet terminals or MSs 12, then there are N sets of forward and reverse control channels CCH-f and CCH-b. Also illustrated is a reverse or backward data or traffic channel (TCH-b) between each of the packet terminals 12 and the base station 14. A forward traffic channel (not illustrated) is also provided. The forward and reverse traffic channels are conveyed by physical data channels (PDCH), which are logically subdivided into a plurality of repeating frames. In the presently preferred embodiment each frame has a duration of 10 milliseconds.

Although referred to as mobile stations, the terminals 12 may be fixed in place.

Being a CDMA system, the MSs 12 spread their respective packet transmission using an assigned spreading code, and then transmit same over the available bandwidth of the channel. In this manner their respective transmissions are effectively summed, indicated by the block 13A, to form a composite signal (CS) to which is added interference and noise, as indicated by the block 13B, to form a total received signal at the base station 14.

Before further describing this invention, a brief description will be made of the presently preferred embodiment of the CDMA system 10.

Key features of the CDMA system 10 are multiuser detection (MUD), a flexible transport scheme (multirate), a large 5.1 MHz bandwidth, coherent demodulation and fast mobile controlled handover with interfrequency handover capability. The main features of the system 10 are summarized in Table 1.

TABLE 1

Main System Features

| | |
|---|---|
| Receiver techniques | RAKE + Multiuser detection (reverse link) |
| | RAKE (forward link) |
| Variable bit rates | supported, frame-by-frame (10 ms) basis |
| Data rates | 0–640 kbps, high rates possible for local coverage |
| Channel spacing | 6 MHz |
| Bandwidth (3 dB) | 5.1 MHz |
| Handover | Mobile controlled |
| Support for hierarchical cells | Burst transmission mode (reverse link) |
| | Dual receiver structure (mobile station) |

MUD increases the system capacity and link budget in the reverse link by eliminating the major part of the own cell interference. In the forward link, the interference of the own cell is reduced using synchronous transmission by near orthogonal spreading codes.

The transport scheme provides flexible data rates from 0 to 640 kbit/s and beyond in steps of 100 bit/s. The multirate concept makes it possible to provide as data rates as high as 2 Mbit/s for supporting local coverage. However, by increasing the bandwidth, e.g. to 10 or 15 MHz, higher data rates are also possible for continuous cellular coverage.

The amount of overhead to support the multirate scheme depends on desired flexibility, and a fixed rate service can be sent without any extra overhead.

The single large 5.1 MHz bandwidth enables easy terminal implementation and good diversity gain.

Coherent reception offering high performance in the reverse link is achieved with help of reference symbols transmitted typically at the rate of 1 kHz.

Fast mobile controlled handover, taking into account both the reverse and the forward link in the decision process, is used to minimize handover time. Furthermore, a seamless handover between micro and macro cells operating in different frequencies enables a radio system with flexible overlay cell structures. The handover between operators having different frequency bands is also a requirement for future radio systems. The seamless handover between frequencies is possible with an interfrequency handover procedure based on a burst transmission mode in the reverse link and a dual transceiver structure in the mobile station.

The provision of flexible data rates with different quality of service requirements can be divided into three subproblems; how to provide desired quality of service, how to map different bit rates into the allocated bandwidth, and how to inform the receiver about the characteristics of the received signal. All these are of equal importance in order to provide a fully-developed solution. Table 2 presents the radio transport parameters of MUD-CDMA.

TABLE 2

Radio Transport Parameters

| | |
|---|---|
| Channel coding | |
| inner code | Convolutional code |
| | (R = 1/3; K = 8, forward link) |
| | (R = 1/2; K = 8, reverse link) |
| outer code | Reed Solomon (rate k/n) |
| Interleaving | 10 ms or more |
| Multirate concept (variable data rates) | Data splitting (forward link) |
| | Variable spreading gain (reverse link) |
| Spreading codes | |
| forward link (data) | Modified Walsh-sequences |
| forward link (pilot) | Gold-like (255 chips) |
| reverse link | VL-Kasami (256 chips) |
| Moduluation | |
| forward link (data) | QPSK |
| reverse link | OQPSK |

Figure 2:
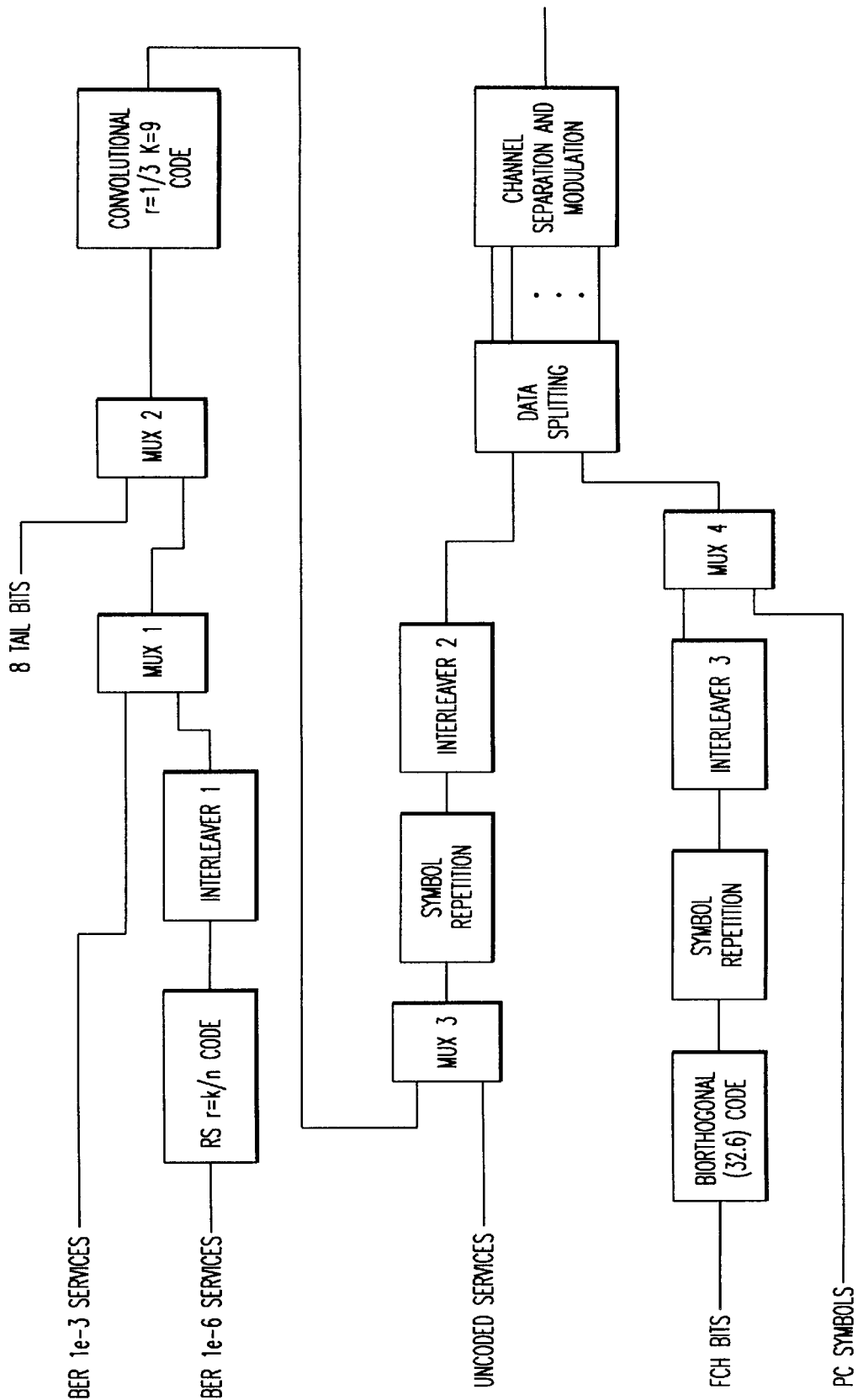
FIG. 2 is a simplified block diagram of the forward link of the system shown in FIG. 1.

The bit error rate (BER) or frame error rate (FER) and transmission delay are used as measures for the quality of service. When the transmission delay requirement has been fixed the desired BER can be provided by several means. Since different services can have different BER requirements a flexible approach is provided. In the MUD-CDMA multirate forward link depicted in FIG. 2 this is done by common convolutional coding producing a BER of $10^{-3}$. In the forward link a rate of ⅓ is used and in the reverse link a rate of ½. The rate ⅓ has better performance but is not utilized in the reverse link due to limited processing gain for high bit rate users. Lower BERs ($10^{-6}$) are produced by using an additional Reed Solomon (RS) code of rate k/n as the outer code (see FIG. 2). It is also possible to have a separate convolutional code for each service enabling different interleaving depths instead of the common code.

After the user data stream has been coded it has to be mapped into the allocated bandwidth. In DS-CDMA two main approaches are possible; splitting the data stream into several codes with fixed spreading gain, or a single code variable spreading gain approach. Also a combination of these is possible. In addition, the use of adaptive forward error correction coding (FEC) may be employed to facilitate the mapping.

For the forward link of MUD-CDMA a data splitting approach was chosen, i.e., the encoded user data is divided into several channels each of 20 ksymbol/s. Since in the forward link users are separated with different code channels which are summed together a linear transmitter is required and therefore parallel transmission can be realized without further increasing the linearity requirements of the transmitter. If a single code approach were to be used the high data rates would lead to a low spreading factor and CDMA characteristics of the signal would be lost. This would affect the performance of a conventional detector. Therefore, since MUD is optional and possibly too complex for a mobile station receiver, it is preferred to utilize a data splitting approach instead of the single code approach in the forward link.

Figure 3:
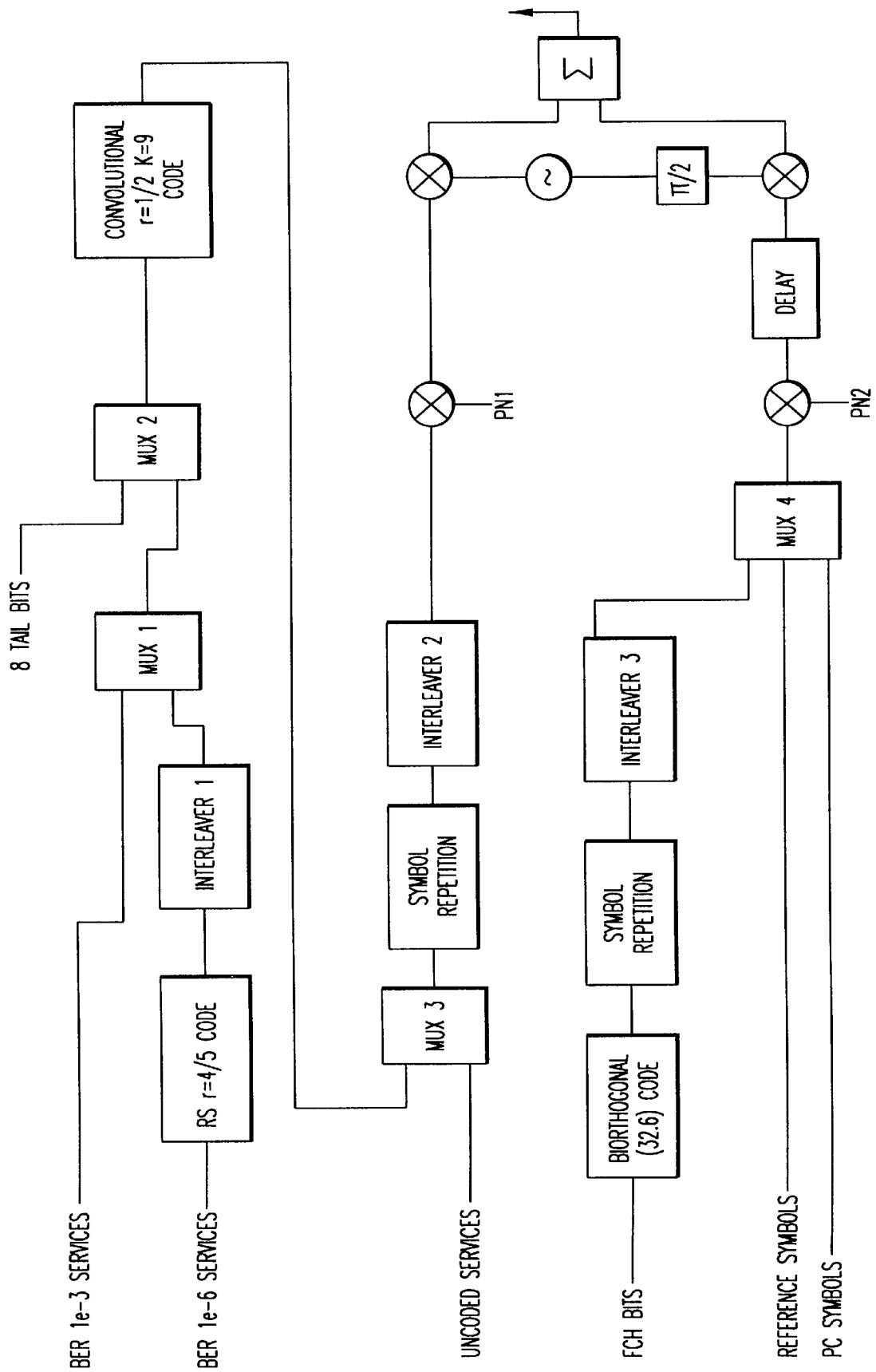
FIG. 3 is a simplified block diagram of the reverse link of the system shown in FIG. 1.

In the reverse link the multilevel signal would require a linear amplifier. Therefore, a variable spreading gain approach was chosen (FIG. 3). Also multiuser detection techniques are easier to implement in the base station due to the higher processing power available.

After the convolutional and RS-coding the resulting symbol stream needs to be matched into the final symbol stream which can be divided into 20 ksymbol/s channels (forward link) or spread by a single code (reverse link). This is preferably carried out by unequal repetition coding which, together with convolutional coding, provides substantially constant gain irrespective of the transmission rate. This approach makes it possible to vary the user data rate with steps as low as, by example, 100 bit/s.

A Frame Control Header (FCH) transmitted on a Physical Control Channel (PCCH) is used to inform the receiver about the transmission rate. This can occur on a frame-by-frame basis. It is also possible to detect the transmission rate from the received signal. However, this approach is suitable only for services for which signal characteristics are somehow known, such as speech or specifically coded data.

In the reverse link a modified very large set of Kasami sequences of length 256 are used. This set includes over a million different sequences. A subset of these codes is assigned to each cell. Short codes are selected to reduce multiuser detection complexity in the base station. They also provide well randomized correlation properties, especially with subcode modulation, and can be employed in non-MUD embodiments. For high data rates each symbol is spread by a subcode of the basic code sequence. With multiuser detection the correlation properties of the codes are not very critical.

In the forward link modified Walsh sequences scrambled with Gold-like sequences are used. The scrambling code separates the cells. Due to the dual channel QPSK modulation used, the two data channels can be modulated with the same modified Walsh code. QPSK modulation was selected because of its enhanced interference randomization properties. In the reverse link dual channel the offset QPSK (OQPSK) modulation is used.

In accordance with an aspect of this invention, the same physical transport concept supports both circuit switched and also packet mode transmission. The packet mode transmission can be either asymmetric or symmetric, or simultaneous with circuit switched services. The PCCH carries feedback information needed for controlling the automatic repeat on request (ARQ) function. Both discontinuous transmission (DTX) and fast random access procedures are utilized to match the discontinuous nature of the packet transmission to the connection-based radio interface. After each packet transmission the physical link is in the DTX mode. After a predetermined time-out the connection is switched off, and can be later recovered by the fast random access procedure whenever needed.

The BS 10 preferably utilizes sectored cells and antenna diversity. The number of sectors depends on the desired capacity.

A reverse link power control function incudes both open loop and fast closed loop control, while the forward link applies fast closed loop control and a long term quality loop.

The foregoing has described a presently preferred embodiment of a DS-CDMA system for practicing this invention. It should be realized, however, that this invention can be practiced in other types of CDMA systems, and can also be practiced in non-CDMA communications systems. As such, the foregoing description of the presently preferred DS-CDMA system is not intended to be construed in a limiting manner upon the practice of this invention.

In accordance with this invention those data terminals or MSs 12 needing cell resources to transmit packet data send a reservation or transmission request to the BS 16 using their associated reverse control channel (CCH-b). The request includes an indication of an amount of resources needed to transmit the packet (e.g., expressed in bits/sec). The BS 16 includes: n receivers 14A (Rx 1–RX N) for receiving the packet data and for generating acknowledgements (ACK) or negative acknowledgements (NACKs), depending on whether a given packet is successfully received; a load monitor 14B coupled to the total received signal; a load control module 14C for receiving reservation requests and a packet mode limit signal Rps from the load monitor 14B; and a multiplexer (MUX) 14D for transmitting transmit permissions to the MSs 12 and respective ACK/NACK signal indications. The load monitor 14B, in accordance with this invention, calculates a total amount of required resources and compares the required amount to a maximum available amount of resources. If the required amount of resources does not exceed the maximum available amount of resources, the load control module 14C grants permission to transmit using a predetermined algorithm or rules base, as described below. The BS 16 sends to each requesting terminal 12 a transmission permission, or a transmission prohibition, using the assigned CCH-fs. Packet terminals or MSs 12 which receive permission to transmit start their packet transmission in the associated TCH-r immediately (i.e., in the next frame).

Figure 4A:
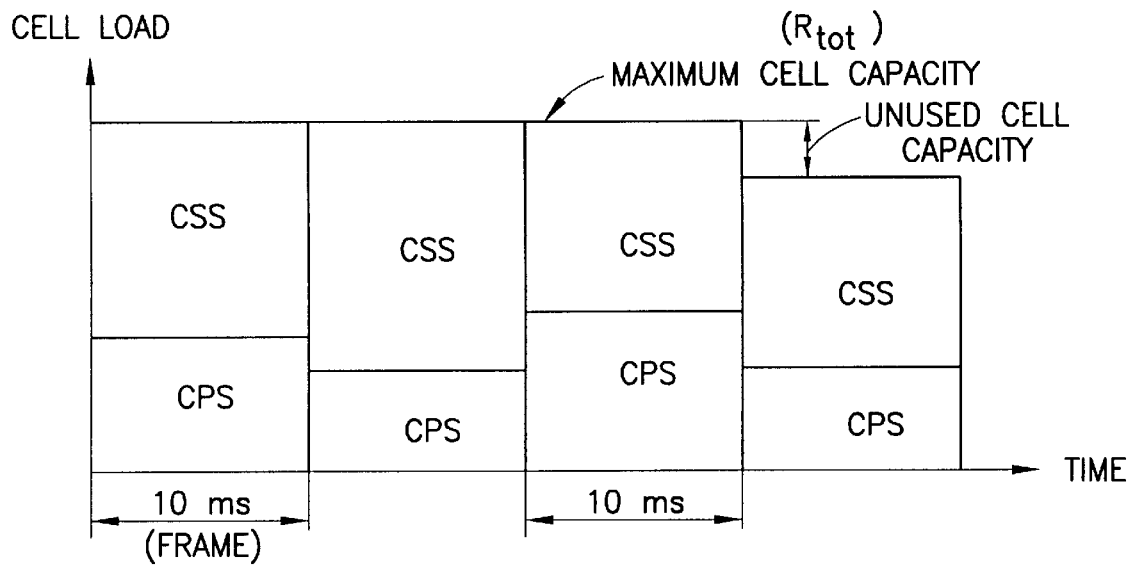
FIGS. 4A and 4B are graphs that are useful in understanding the load control method of this invention, wherein cell loading is plotted against time.
Figure 4B:
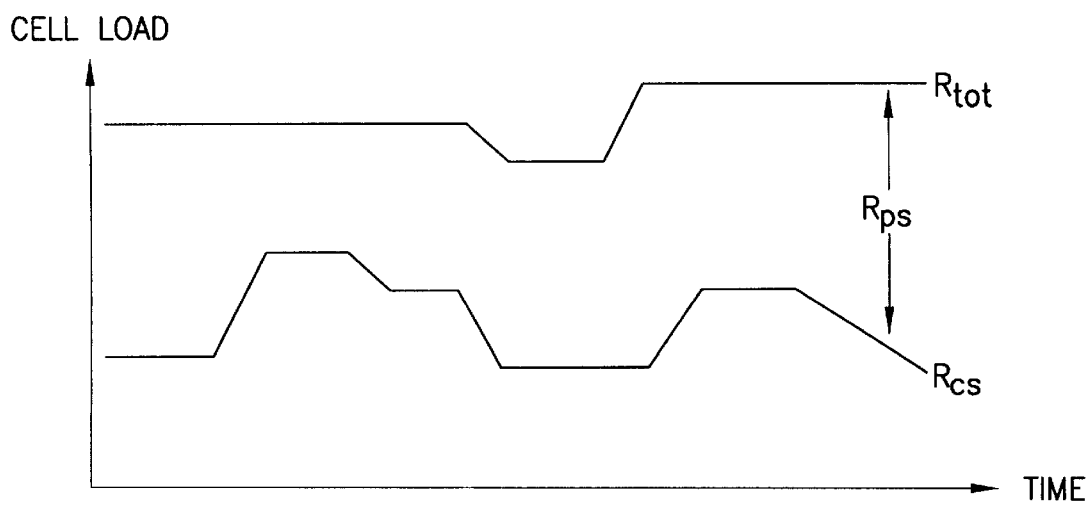

An important aspect of this invention is that the limit value for the packet mode resources (Rps) can be determined in the load monitor 14B using the following relationship:

$$Rps = Rtot - Rcs,$$

where Rtot is the total capacity of the cell and Rcs is the load of the circuit switched terminals (not shown in FIG. 1). As is made evident in FIGS. 4A and 4B, the packet mode limit value Rps can vary dynamically and rapidly, depending on changes in Rtot and Rcs. The value of Rps can vary from frame to frame (e.g., every 10 milliseconds). By transmitting an access message during a random access procedure in a transmit state (described below), a MS 12 reserves cell resources that can be used for packet terminals. In FIG. 4A there is shown both the circuit packet service (CPS) and the circuit switched service (CSS) components of the cell load, on a frame-by-frame basis.

In one embodiment of the invention a base station controller (BSC) 16 optimizes the load of the system over several cells, and determines a separate limit value for each base station 14. The various BSs 14 control the packet terminals 12 in their respective cells based on this limit value. In this embodiment each load monitor 14B determines the total cell communications loading, and then transmits this value to the BSC 16. The BSC 16 in turn sends each BS 14 a value for Rps. The value of Rps can vary from cell to cell, at least in part on the loading of adjacent cells.

Referring again to FIGS. 4A and 4B, there is illustrated the principle of resource allocation within a cell. The circuit switched service (CSS), due to its real-time nature, normally has a higher priority than the packet switched service (CPS). There exists no fixed allocation of resources, but all of the resources can be given to either of services. This guarantees the flexibility of the system 10. Furthermore, are certain times (e.g., the fourth 10 millisecond frame illustrated in FIG. 4A) the total system demand does not equal or exceed the total system resources. In this case there will be some unused cell capacity. Also in this case, it may be possible to assign a higher value of Rps to adjacent cells.

In a first load assignment algorithm in accordance with this invention, and referring again to FIG. 1, data terminals (e.g., facsimile machines) that are assumed to be attached to the MSs 12 generate data (TX DATA) at a certain rate. Each MS 12 packetizes the data by adding any required headers, trailers, addresses, data integrity bits, etc., and stores the packets in the buffer 12A. The MSs 12 also monitor the number of packets that are stored in their respective buffers 12A. When the number of packets in the buffer 12A exceeds a threshold value (e.g., three), or when a packet has been stored in the buffer for a period that exceeds a predetermined time threshold (e.g., 100 ms), the MS 12 sends a reservation request to the BS 14 on the associated CCH-b. The requesting MS 12 also informs the BS 14 of its capacity needs for the transmission (e.g., bits/second). The MS 12 continues to send the request to the BS 14 until it receives, over the CCH-f, a permission to transmit. This technique of sending multiple requests avoids the possibility that a single request might not be correctly received and acted on by the BS 14. If the MS 12 is in a handoff mode, the BC determines whether it is able to delay the on-going call of the MS 12, or whether the MS is able to transmit on a lower transmission power due to an overload situation in the new cell.

The BS 14 monitors the reservation requests that are received from the MSs 12 and either stores them in the order received or time-tags them. If there are more requests than the BS 14 is able to grant, those MSs whose reservations requests arrived earliest receive permission to transmit in the next frame (i.e., 'first in-first served'). In every frame, the BS 14 checks the capacity of the cell and may receive information from the BSC 16 on the state of other cells. The BS 14, in particular the load monitor module 14B, calculates the maximum power that is allowed in the area of its cell. If there has been a change either in the power level of the circuit switched connections, or in other cells surrounding the cell, such that the increase in power affects the quality of packet switched connections, the BS 14 may interrupt a transmission of a given one of the MSs 12. That is, the BS 14 may place the MS 12 into a discontinuous transmission (DTX) mode of operation. The BS 14 checks in every frame the allowed permissions (for the next frame) and current permissions (for the current frame). If it is possible to release more resources for the queued MSs, the BS 14 sends permissions to transmit for the queued MSs. After the release of a given MS 12, the BS 14 checks the allowed system capacity for packet users and the indicated transmission requirements (e.g., bit/sec) of MSs 12 in the queue. If the required resources are less than the amount available to the packet mode MSs (i.e., if the required resources are less than Rps), transmission of the MS 12 is allowed again in the next frame. In each frame, this procedure is repeated. The BS 14 maintains a bit for each MS 12 that indicates permission to transmit as a "1" (i.e., enabled), unless the BS 14 is required to interrupt the transmission of a particular MS 12.

When a MS 12 has received permission from the BS 14 to transmit, and in accordance with the first algorithm, the MS 12 is enabled to transmit all packets that are stored in the buffer 12A. If new data arrives and is stored as one or more new packets in the buffer 12A, while transmission is on-going, these newly arrived packets may also be transmitted. When the buffer 12A is empty, the MS 12 sends a transmission end signal to the BS 14 on the associated CCH-b, in order to inform the BS 14 that the assigned resources can be released for other users. The BS 14 notes the transmission end signal when checking the current permissions for the next frame, and is thus enabled to release the resources to another MS 12 in the queue (assuming that the value of Rps has not decreased).

Figure 5:
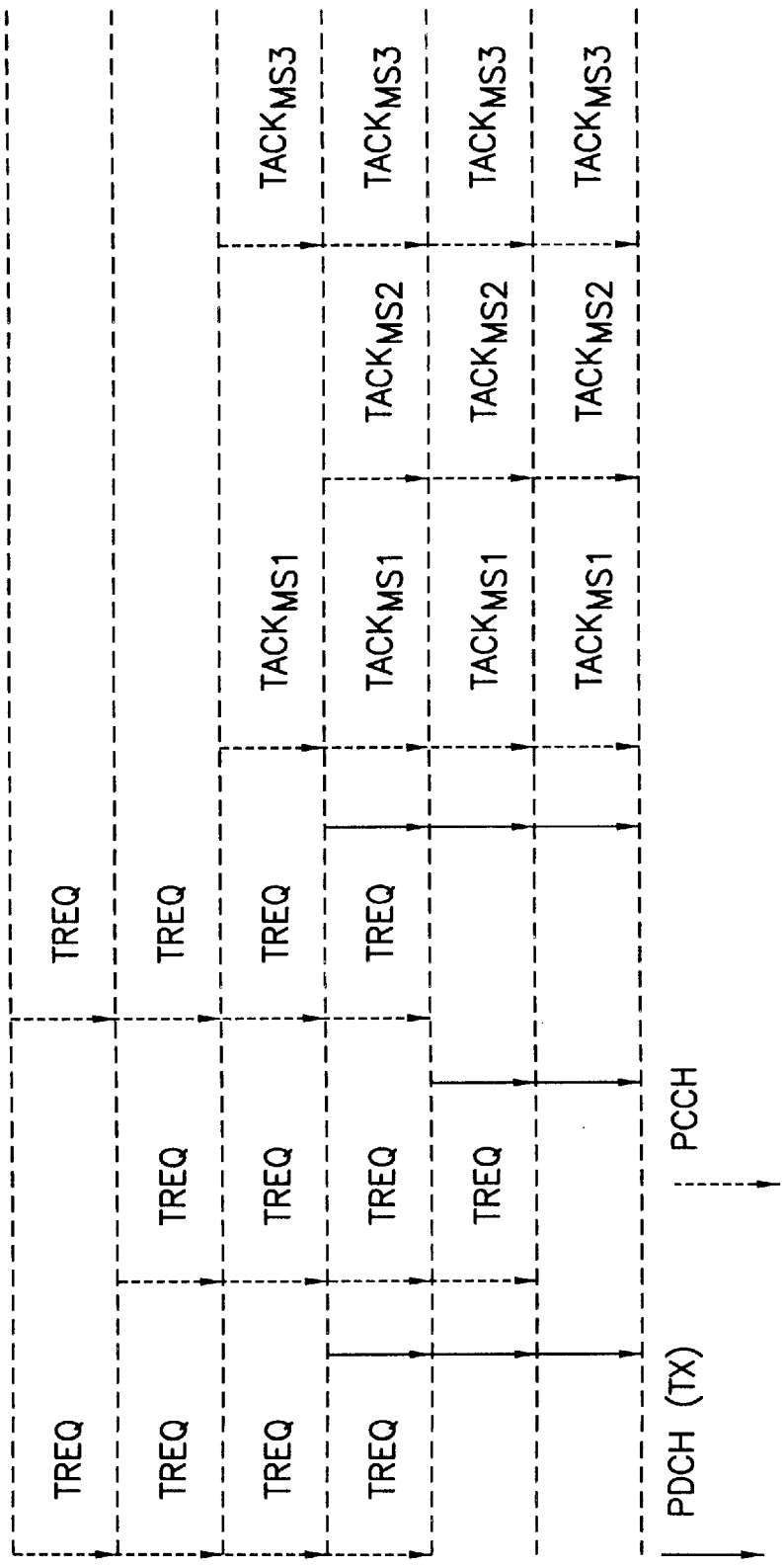
FIG. 5 is a logic flow diagram that illustrates signalling information that passes between a mobile station and a base station.

FIG. 5 is a flow diagram of this first load control algorithm. All the various signals that are required to be present before a transmission are shown. TREQ is a transmission request made by MSs and TACK is a transmission acknowledgement made by the BS 14 to the MS 12 that sent a TREQ. PDCH illustrates a transmission on the physical data channel and PCCH corresponds to a transmission of control bits on the physical control channel. As can be seen, each MS 12 transmits requests for transmission, and the BS 14 permits the transmissions after processing the requests.

A discussion is now made of the second load control algorithm that may be used in the CDMA packet system 10. Compared to the first algorithm, there exist some features in the second algorithm that the first algorithm does not support. First, in the second algorithm each MS 12 monitors the maximum packet delay in the buffer 12A, and when the value exceeds some predetermined value, which is common to all MSs 12, the MS 12 increases a transmission request priority. That is, at least one bit that forms the transmission request (TREQ) indicates a priority of the request (e.g., 0=normal priority and 1=high priority). In this manner the average delay in transmitting a packet, from the time of receipt, can be reduced. Synchronization issues can also be eliminated, since the BS 14 collects the requests and processes them once every frame (e.g., 10 milliseconds), and since the MSs 12 do not need to transmit their requests at same time (i.e., the requests are asynchronous to one another).

In addition, if a MS 12 has requested permission to transmit in the previous frame, but has not received permission, this MS increases the priority of the next transmission request. This technique further reduces synchronization between MSs 12, as different NSs 12 may be transmitting reservation requests with different priority levels.

In the first algorithm that was described above the BS 14 gives permission to transmit, and the permission can remain effective over a number of consecutive frames (e.g., until the MS 12 has emptied its buffer 12A). However, in accordance with the second algorithm the BS 14 instead gives permission to transmit on a frame-by-frame basis while considering the priority levels of the requests. A controllable threshold defines the total throughput in each frame. The threshold is set once in a frame before processing the MS requests. Consecutive thresholds can have different values.

When a MS 12 receives the permission to transmit, it transmits in the next frame. After the transmission of a packet, the MS 12 determines whether it has more than some number (e.g., three) packets in its buffer 12A, or whether a packet has been in the buffer 12A for more than some predetermined period of time (e.g., 100 ms). If either condition is found to exist, the MS 12 sends a request for packet transmission (i.e., a reservation request).

A packet that needs to be retransmitted (i.e., a packet that was NACKed by the associated receiver RX 14A), is preferably always given a highest priority. This is true since in most cases this packet will also have been resident in the buffer 12A for the longest time. As such, the MSs 12 retain a transmitted packet in the buffer 12A until the receipt of the packet is ACKed by the associated receiver RX 14A. If the packet is instead NACKed, the MS 12 is thus enabled to retransmit the packet.

It is within the scope of this invention to implement priority levels for different users so that some services get preference for transmission in a frame. These services could be, for example, remote control services, which may require accurate and rapid transfer of information.

Figure 6:
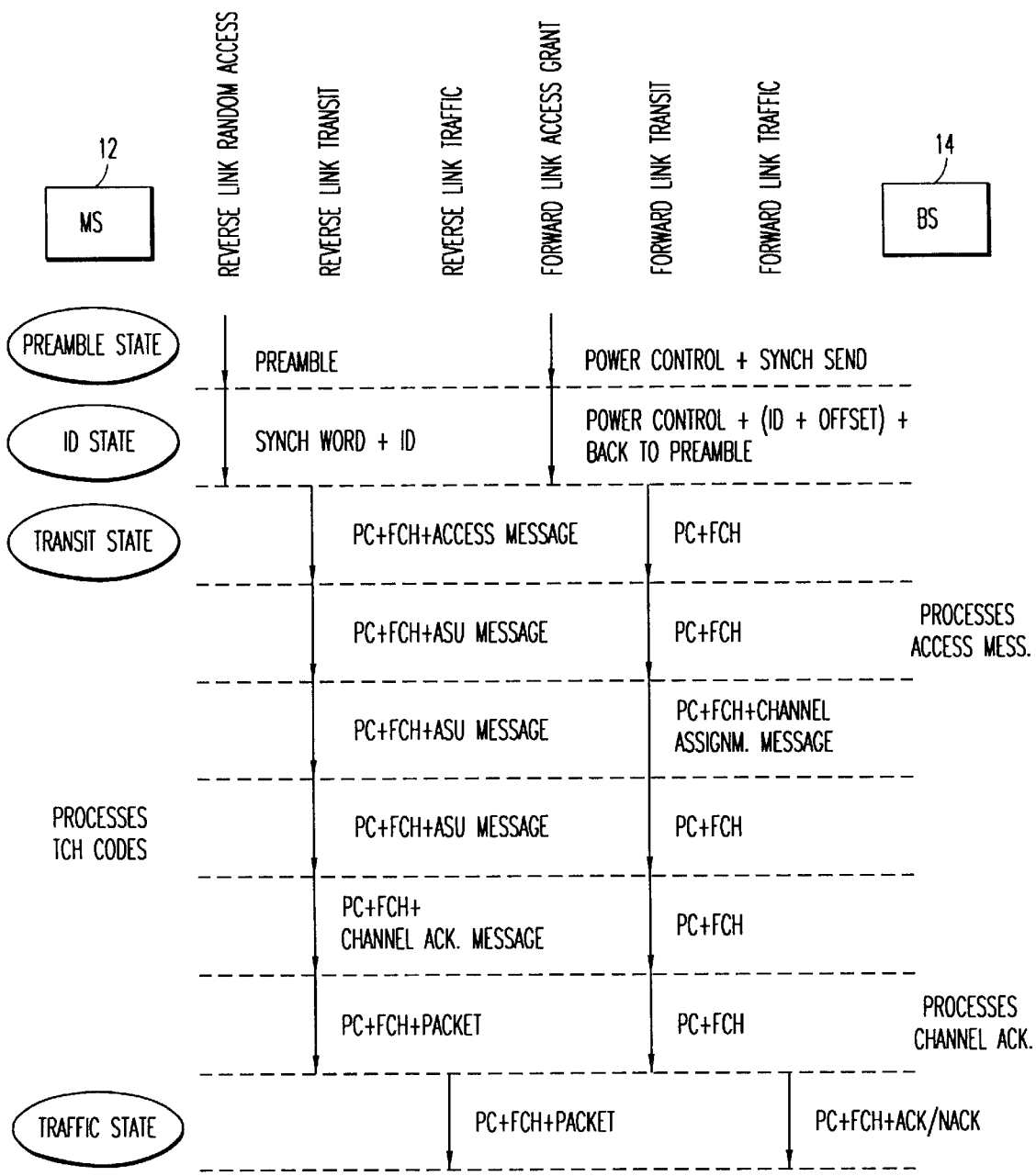
FIG. 6 is logic flow diagram of a random access procedure for packets that are sent in the reverse link.

FIG. 6 illustrates in greater detail the random access procedure when packets are to be sent in the reverse link direction (e.g., from MS 12 to BS 14). At the beginning of a Transit state (after Preamble and ID states) the MS 12 sends an Access message. The Access message contains, for example, the ID of the MS 12, the capacity requirements, power control bits (pc), and a Frame Control Header (FCH) structure which indicates, at least in part, the data transmission rate that the MS 12 wants to use (e.g., the MS 12 may send by default the highest data rate that it is capable of transmitting). If the network already contains the requirements of the MS 12 (e.g., prestored in a register), the MS 12 need only to refer to this register. After the Access message the MS 12 sends an Active Set Update (ASU) message. In this way the delay for building up a soft handover for packet transmission can be minimized. The network (e.g., the BSC 16 of FIG. 1) builds up the connections to the selected active set of BSs and sends a Handoff direction message later to the MS, when the connections are available.

After the BS 14 has processed the Access message, it sends a Channel Assignment message to the MS 12. The Channel Assignment message contains at least two traffic channel spreading codes, for the reverse link and forward link, and the maximum allowable transmission rate for the preferred FCH scheme.

After the MS 12 has received and processed the Channel Assignment message, it sends a Channel Acknowledgement message in the reverse link (CCH-b). In this message the MS 12 acknowledges the assigned traffic channel spreading codes and the FCH scheme.

During the Transit state the MS 12 uses a fixed FCH scheme, since no signaling has yet been made between MS 12 and BS 14 to agree upon a specific FCH scheme. The fixed FCH scheme can be, e.g. only one FCH bit, which means that MS 12 can either be in a discontinuous transmission (DTX) mode (FCH bit=0 for rate 0), or may send a packet or a message at a fixed rate (FCH bit=1).

When the MS 12 has sent the ASU message it can immediately start to send packets, even if it is still in a transit channel. The packets must be sent, however, at a fixed rate as long as the MS 12 is in the Transit channel.

After the MS has sent the Channel Acknowledgement message it moves to the Traffic channel. The new FCH scheme is used for the first time in the Traffic channel. The first frame using the new FCH scheme is a fixed rate frame, determined beforehand in the Channel assignment message.

Figure 7:
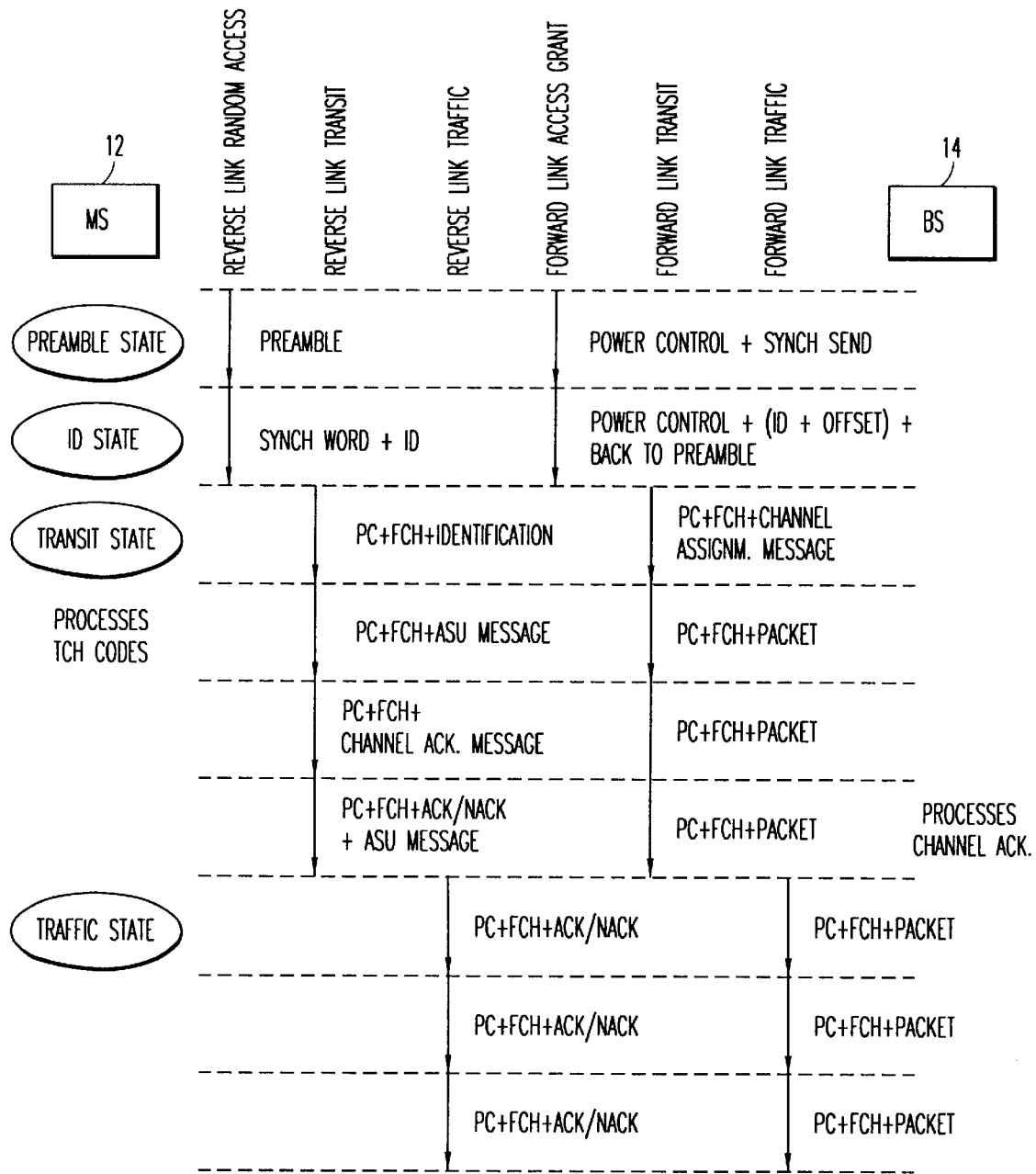
FIG. 7 is logic flow diagram of a random access procedure for packets that are sent in the forward link.

For completeness, FIG. 7 shows the random access procedure when packets are sent in the forward link direction. After the Preamble and ID states, the BS 14 sends a Channel Assignment message at the beginning of the transit state, containing the FCH scheme used in the connection, the transmission rate of the first frame with the new FCH scheme, and the channel code for the forward traffic channel link. There can be more than two codes assigned to the forward link if capacity requires. A fixed FCH scheme is used in the transit channel until the BS 14 has received the Channel Acknowledgement message from the MS 12. The fixed FCH scheme is one FCH bit per frame, which made two rates possible: the DTX mode and a fixed rate for sending a packet or message.

At the beginning of the transit state the MS 12 first sends an identification of itself. This is to confirm that the correct MS 12 has responded to a previously sent Paging message. The MS 12 then sends the ASU message. If the ASU message is longer than the transit state, it may be continued and sent in the traffic channel.

The BS 14 may start the packet transmission after it has sent the Channel Assignment message. The packets are, however, sent at a fixed rate, until the BS 14 has received the Channel Acknowledgement message from the MS 12.

After the BS 14 has received and processed the Channel Acknowledgement message, both BS 14 and the MS 12 move to the Traffic channel. The new FCH scheme is first used in the Traffic channel and a multirate transmission can be started. The first frame in the Traffic channel is still, however, transmitted at the fixed rate, which is determined beforehand in the Channel Assignment message.

With specific regard now to the system load control in the reverse link for packet mode transmissions, the following points are noted. First, the load control technique in accordance with this invention makes certain assumptions.

A first assumption is that a certain share of the total resources are reserved for packet transmissions. This share, denoted here as Rps (which can be, e.g., a total amount of allowed transmit bits per time unit or the total power allowed for packet transmissions as measured at the base station's receiver), can vary as a function of time due to changes in the total traffic of the system. The total traffic can be estimated using, by example, the equation:

$$\mathrm{Load}_{reverse} = \Sigma(\mathrm{SIR}_{th,i}/G_i),$$

where SIR is the signal to interference ratio, and $G_i$ is the processing gain, defined as $W/R_i$, where W is the RF signal bandwidth and $R_i$ is the user bitrate for the call.

A second assumption is that packet switched MSs 12 request permission for transmission by sending transmission requests to the BS 14.

A third assumption is that the BS 14 knows the allowed transmission rated for each packet MS 12, as the bit rates are agreed upon during the cell access phase.

In operation, the BS 14 calculates periodically (once per frame, e.g., every 10 ms) the total amount of requested resources $R_{current}$ by monitoring the transmission requests from the MSs 12 and taking into account the allocated transmission rates.

If $R_{current} \leq Rps$, the BS 14 transmits transmission permissions to all MSs 12 that have requested permission to transmit.

If $R_{current} \geq R_{ps}$, the BS transmits transmission permissions to selected MSs 12 such that the total amount of allocated resources do not exceed Rps. In this case the BS 14 can either give permissions to only some of the MSs 12 (the MSs 12 can belong to different priority classes, which are determined during the cell access phase), or may give permission to transmit to all MSs 12, but for certain MSs at lower transmission rates.

With regard now to the operation of the MSs 12, after a MS 12 receives the TX DATA from a data source (e.g., a facsimile machine), it produces packets, and stores them in the buffer 12A. The MS 12 waits until the number of packets in the buffer 12A equals Nb (e.g., Nb=3), or until the oldest packet has been in the buffer 12A more than Tb1 seconds (e.g., Tb1=100 milliseconds). When either condition is satisfied, the MS 12 sends a request to transmit to the BS 14 on the CCH-b. The information that is sent from MS 12 to the BTS 14 is a transmission request along with the requested bit rate (packet length) for the next frame.

The BS 14 sends a permission/no permission message every Tb2 second (Tb2=10 milliseconds (e.g. every frame)). The MS 12 monitors this message and transmits one packet whenever it receives a permission to transmit. The information that is sent from the BS 14 to the MS 12 is the automatic repeat on request (ARQ) ACK/NACK of a previous packet (if any), the transmission permission, and the allowed or assigned bit rate (packet length) for the next frame.

As was described above, the requested and assigned bit rates are defined by bits in the FCH message, with the number of bits determining the number of available rates. One rate (zero) is always reserved for the DTX mode, and the FCH scheme is agreed upon during the access state, as was described previously. For low transmission rates (e.g., <16 kbit/s) only one FCH bit may be used to minimize the FCH overhead. In this case the packet transmission is performed using an "on/off" principle. There are thus two rates available, zero rate for the DTX mode and a fixed rate for sending a packet. If assigned a zero rate for the next frame, the MS 12 does not transmit in the next frame, and thus operates discontinuously. For higher transmission rates more FCH bits can be used (e.g., two bits enables the zero rate plus three other rates). The bit rate can be varied on a frame-by-frame basis, if system loading requirements so dictate.

Although described in the context of preferred embodiments, it should be realized that a number of modifications to these teachings may occur to one skilled in the art. By example, other load control algorithms can be employed than those specifically described above. Also, a plurality of different load control algorithms can be used by the system 10. By example, at certain times the use of the first algorithm may be desirable, while at other times the use of the second algorithm may be preferred. Furthermore, and as was noted previously, the teaching of this invention is not limited for use only with the presently preferred CDMA embodiment. By example, in other embodiments of this invention a separate control channel may not be provided for each MS 12, and the control and traffic channels may be time multiplexed. Nor is the teaching of this invention limited for use only in CDMA-type systems. By example, aspects of this invention may be employed to advantage in certain TDMA systems.

It should further be realized that a given one of the MSs 12 may at one time be a circuit switched terminal (i.e., a real-time terminal), and at another time a packet switched terminal (i.e., a nonreal-time terminal).

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a wireless communications system of a type that comprises a plurality of wireless terminals capable of transmitting packet data and a base station for receiving the packet data, comprising the steps of:

establishing a bidirectional control channel between the base station and individual ones of the wireless terminals such that each wireless terminal has its own bidirectional control channel;

for a wireless terminal that has data to transmit to the base station, subsequently establishing a data channel between the base station and the wireless terminal having data to transmit; and transmitting packets of data from the wireless terminal to the base station over the established data channel under the direction of messages exchanged over the control channel that was established for that wireless terminal, wherein the step of transmitting is initiated upon an occurrence of at least one of a predetermined number of packets being stored in a memory of the wireless terminal or a packet being stored in the memory for a predetermined period of time.

2. A method for operating a wireless communications system of a type that comprises a plurality of wireless terminals capable of transmitting packet data and a base station for receiving the packet data, comprising the steps of:

establishing a bidirectional control channel between the base station and individual ones of the wireless terminals such that each wireless terminal has its own bidirectional control channel;

for a wireless terminal that has data to transmit to the base station, subsequently establishing a data channel between the base station and the wireless terminal having data to transmit; and transmitting packets of data from the wireless terminal to the base station over the established data channel under the direction of messages exchanged over the control channel that was established for that wireless terminal, wherein the step of establishing the bidirectional control channel between the base station and one of the wireless terminals occurs before the wireless terminal has a packet of data to transmit.

3. A method as in claim 2, wherein each control channel is a point-to-point channel comprised of a forward control channel from the base station to the associated wireless terminal and a backward control channel from the wireless terminal to the base station.

4. A method as in claim 2, wherein the step of transmitting comprises a preliminary step of sending a transmission request from the wireless terminal to the base station over the control channel.

5. A method as in claim 4, wherein the transmission request comprises information for specifying a desired transmission rate.

6. A method as in claim 4, wherein the step of transmitting comprises a further preliminary step of sending a permission to transmit from the base station to the requesting wireless terminal over the control channel.

7. A method as in claim 6, wherein the permission to transmit is comprised of information for specifying an assigned transmission rate.

8. A method as in claim 2, wherein the wireless terminal operates in one of a Discontinuous Transmission (DTX) mode or a non-DTX mode.

9. A method as in claim 2, wherein the bidirectional control channel between the base station and one of the wireless terminals remains established during pauses in packet data transmission.

10. A method as in claim 2, wherein each of the channels has an associated spreading code.

11. A method for operating a wireless communications system of a type that comprises a plurality of wireless terminals capable of transmitting packet data and a base station for receiving the packet data, comprising the steps of:

establishing a bidirectional control channel between the base station and individual ones of the wireless terminals such that each wireless terminal has its own bidirectional control channel;

for a wireless terminal having no packet data to transmit to the base station, operating in a control channel hold state wherein the control channel remains established;

for a wireless terminal that has data to transmit to the base station, transitioning from the control channel hold state to a state wherein a data channel is established between the base station and the wireless terminal; and transmitting at least one packet of data from the wireless terminal to the base station over the established data channel under the direction of messages exchanged over the control channel that was established for that wireless terminal, wherein the step of transitioning from the control channel hold state is initiated upon an occurrence of at least one of a predetermined number of packets being stored in a memory of the wireless terminal or a packet being stored in the memory for a predetermined period of time.

12. A method for operating a wireless communications system of a type that comprises a plurality of wireless terminals capable of transmitting packet data and a base station for receiving the packet data, comprising the steps of:

establishing a bidirectional control channel between the base station and individual ones of the wireless terminals such that each wireless terminal has its own bidirectional control channel;

for a wireless terminal having no packet data to transmit to the base station, operating in a control channel hold state wherein the control channel remains established;

for a wireless terminal that has data to transmit to the base station, transitioning from the control channel hold state to a state wherein a data channel is established between the base station and the wireless terminal; and transmitting at least one packet of data from the wireless terminal to the base station over the established data channel under the direction of messages exchanged over the control channel that was established for that wireless terminal, wherein the step of establishing the bidirectional control channel between the base station and at least one of the individual ones of the wireless terminals occurs before the at least one wireless terminal has a packet of data to transmit.

13. A method as in claim 12, wherein each control channel is a point-to-point channel comprised of a forward control channel from the base station to the associated wireless terminal and a backward control channel from the wireless terminal to the base station.

14. A method as in claim 12, wherein the step of transitioning from the control channel hold state comprises a step of sending a transmission request from the wireless terminal to the base station over the control channel.

15. A method as in claim 14, wherein the transmission request comprises information for specifying a desired transmission rate.

16. A method as in claim 14, wherein the step of transitioning comprises a further step of sending a permission to transmit from the base station to the requesting wireless terminal over the control channel.

17. A method as in claim 16, wherein the permission to transmit is comprised of information for specifying an assigned transmission rate.

18. A method as in claim 12, wherein the wireless terminal operates in one of a Discontinuous Transmission (DTX) mode or a non-DTX mode.

19. A method as in claim 12, wherein the bidirectional control channel between the base station and one of the wireless terminals remains established during pauses in packet data transmission.

20. A method as in claim 12, wherein each of the channels has an associated spreading code.

21. A wireless communications system of a type that comprises a plurality of wireless terminals capable of transmitting packet data and a base station for receiving the packet data, comprising:

means for establishing a bidirectional control channel between the base station and individual ones of the wireless terminals such that each wireless terminal has its own bidirectional control channel;

for a wireless terminal having no packet data to transmit to the base station, a control means for operating the wireless terminal in a control channel hold state wherein the control channel remains established;

for a wireless terminal that has data to transmit to the base station, said control means operating to transition the wireless terminal from the control channel hold state to a state wherein a data channel is established between the base station and the wireless terminal; and means for transmitting at least one packet of data from the wireless terminal to the base station over the established data channel under the direction of messages exchanged over the control channel that was established for that wireless terminal, wherein the means for transmitting operates in response to an occurrence of at least one of a predetermined number of packets being stored in a memory of the wireless terminal or a packet being stored in the memory for a predetermined period of time.

22. A wireless communications system as in claim 21, wherein each control channel is comprised of a point-to-point channel comprised of a forward control channel from the base station to the associated wireless terminal and a backward control channel from the wireless terminal to the base station.

23. A wireless communications system as in claim 21, wherein the control means operates, when transitioning from the control channel hold state, to send a transmission request from the wireless terminal to the base station over the control channel, the transmission request comprising information for specifying a desired transmission rate, and further operates to receive a permission to transmit from the base station over the control channel, the permission to transmit comprising information for specifying an assigned transmission rate.

* * * * *